Jan. 24, 1967   R. CREUTZMANN ETAL   3,300,023
TRANSPORTING CARRIAGE FOR CONVEYER SYSTEM
Filed May 10, 1965   3 Sheets-Sheet 3
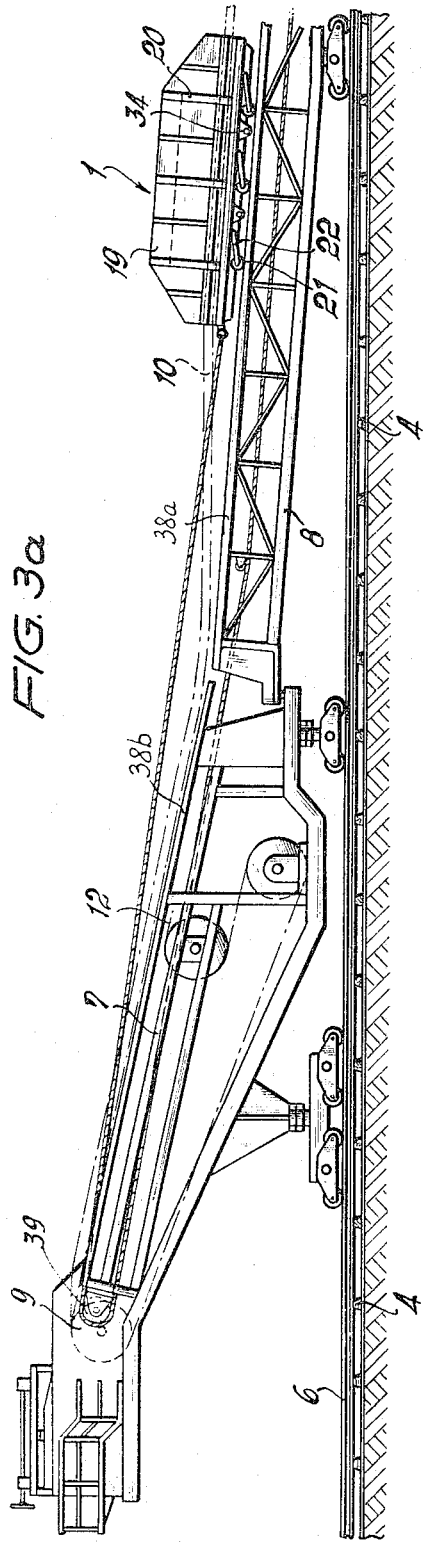
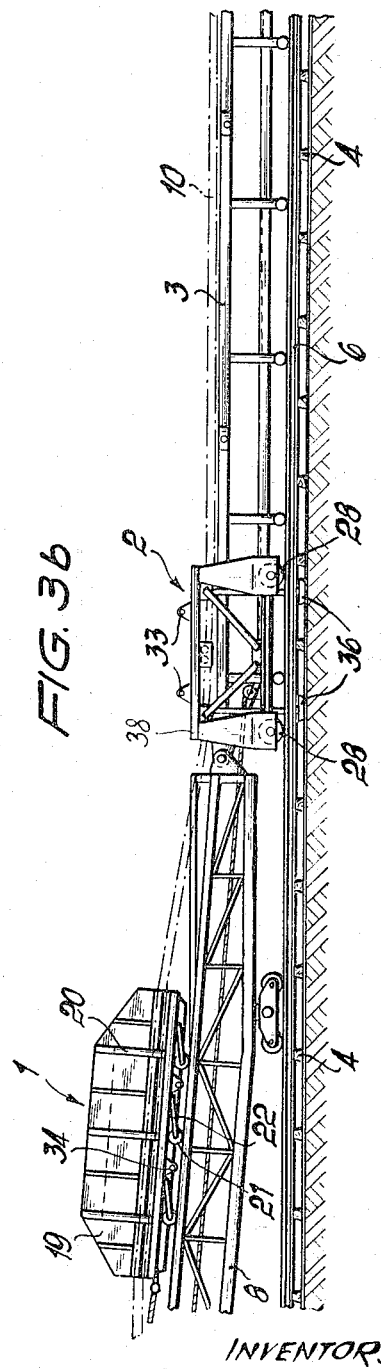
INVENTORS
REINHOLD CREUTZMANN
HANS WULLSCHLAEGER
BY
their ATTORNEY.

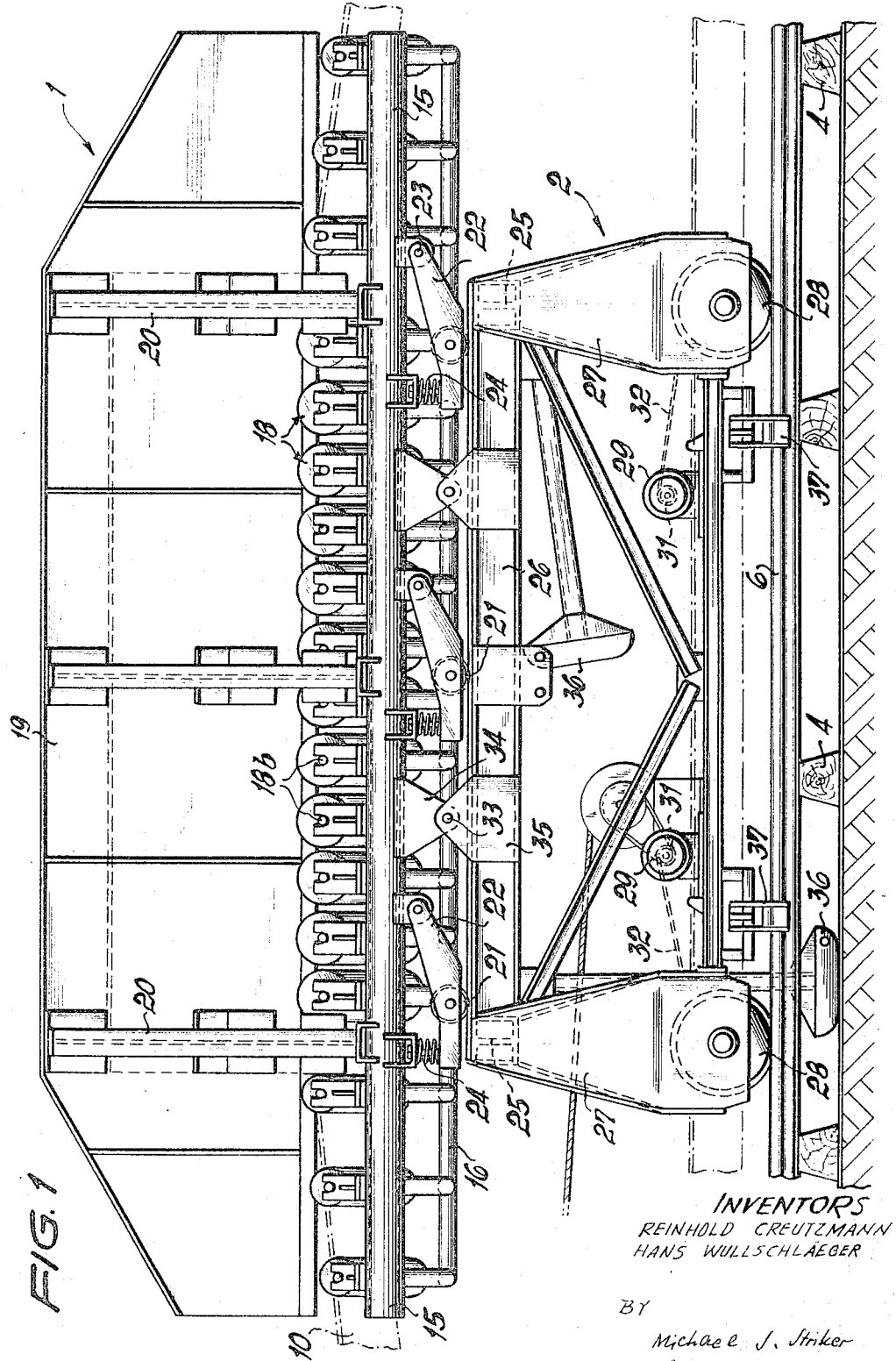

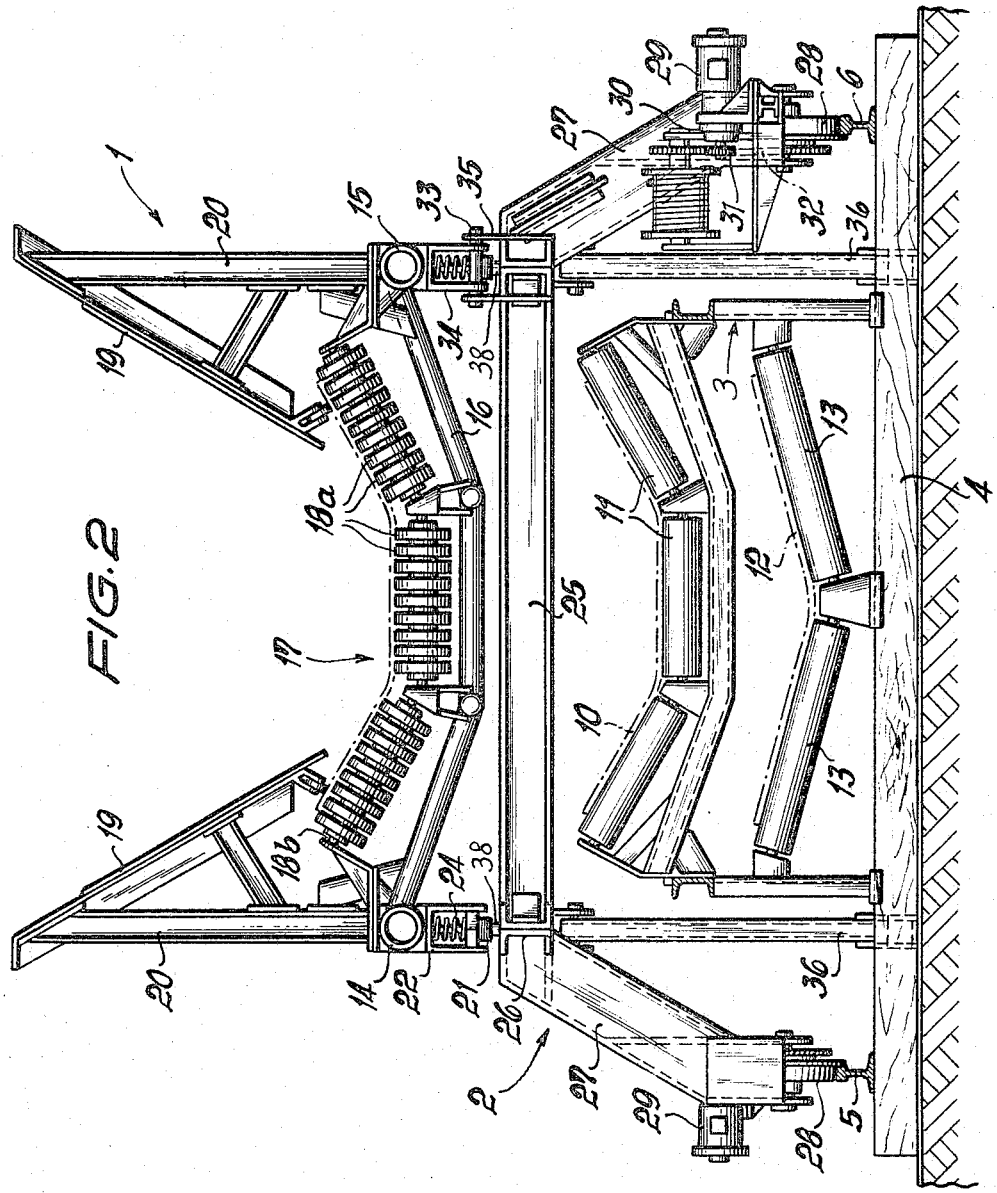

3,300,023
TRANSPORTING CARRIAGE FOR CONVEYER SYSTEM

Reinhold Creutzmann, Allrath, and Hans Wullschlaeger, Wevelinghoven, Germany, assignors to Maschinenfabrik Buckau R. Wolf Aktiengesellschaft, Grevenbroich, Germany
Filed May 10, 1965, Ser. No. 454,390
Claims priority, application Germany, May 8, 1964, M 60,919
14 Claims. (Cl. 198—36)

The present invention relates to conveyer systems in general, and more particularly to improvements in conveyer systems of the type which may be utilized with advantage in surface or strip mining to transport broken ore, earth or similar material. Still more particularly, the invention relates to an improved conveyance or vehicle which may be utilized in such conveyer systems.

A conveyer system for use in surface mining normally comprises a horizontal main truss including a series of supporting frames for the material transporting belt, and a terminal truss including a sloping driving station which is preferably connected with the foremost supporting frame by an inclined bridge. The supporting frames rest on ties which are mounted on or embedded in the ballast and which carry rails constituting a horizontal track for the conveyance. The rails may be provided at one or both sides of the supporting frames, and the conveyance comprises an upper portion defining a chute which can be advanced along the rails to control the delivery of material onto the upper stringer of the material transporting belt. The chute is located at a level above a suitably configurated supporting assembly of the conveyance which extends beneath and supports a portion of the upper stringer. This supporting assembly is located at a level above such portions of the supporting frames which support the remainder of the upper stringer. A conveyer system of this type is described in the British Patent 704,239 and the U.S. Patents 2,554,077 and 2,641,353.

A serious drawback of many such conventional conveyer systems is that their conveyances cannot be advanced all the way to the upper or discharge end of the driving station because the chute is rigid with the remainder of the conveyance. As explained above, not only the bridge but also the driving station slopes upwardly toward the discharge end of the path for the material transporting belt so that the conveyance can advance only to the lower end of the bridge because it travels along a horizontal track. Proposals to overcome such drawbacks include the provision of rails on the main truss and on the terminal truss so that the entire conveyance can travel all the way up to the discharge end of the path for the material transporting belt. (See German Patent 1,108,610.) Of course, and in order to properly support the conveyance, the supporting frames of the main truss must be assembled of heavy parts which are difficult to transport and whose initial cost exceeds considerably the cost of normal supporting frames. The conveyance is quite heavy and, therefore, not only the supporting frames of the main truss but also the bridge and the driving station of the terminal truss must consist of exceptionally heavy and rigid parts so that the added cost of the just described conventional conveyer systems exceeds the savings and advantages which are achieved if the conveyance can be advanced all the way to the top of the driving station.

It was also proposed e.g. in the specification of the Australian Patent 211,715, to utilize a substantially sled-like conveyance which is guided and supported by rollers provided on the supporting frames for the material transporting belt and by rollers provided on the terminal truss. Such sled-like conveyances can be advanced to the upper end of the driving station; however, the supporting frames for the belt are subjected to excessive stresses, especially when large quantities of material are dumped through the chute and onto the belt. It was found that the rollers which support the runners of such sled-like conveyances are destroyed after relatively short periods of use unless they are reinforced at a cost exceeding the advantages which are gained if the conveyance can be made to travel along the bridge and along the driving station. As a rule, the length of the terminal truss including the bridge and the driving station is at least 50 meters. This length of the path for the material transporting belt can be utilized for loading of material only if the conveyance can travel all the way to the top of the driving station.

Accordingly, it is an important object of our present invention to provide a conveyer system for use in surface mining and for similar purposes and wherein the construction of the conveyance is such that its chute can travel all the way to the top of the driving station without necessitating the provision of heavy, bulky and expensive supporting frames for the belt and without necessitating the provision of specially constructed and/or reinforced bridges or driving stations.

Another object of the invention is to provide a conveyance of the just outlined characteristics which is constructed and assembled in such a way that only a portion thereof must travel along the inclined section of the path for the material transporting belt and that the remainder of the conveyance may be safely anchored in that section of the path which is normally horizontal so that the drive for advancing the conveyance along the horizontal section of the path need not be overly strong.

A further object of the invention is to provide a conveyance of the above outlined type wherein the drive which causes the conveyance to advance along a horizontal section of the path for the material transporting belt may be utilized to advance the chute along the inclined section of the path and all the way to the top of the driving station.

An additional object of the invention is to provide a novel material loading upper carriage for use in such conveyer systems and to construct the upper carriage in such a way that it need not be supported by the supporting frames which guide and carry the horizontal portion of the material transporting belt.

Still another object of the invention is to provide a conveyance which, with minor adjustments, can be utilized in presently known conveyer systems and whose utilization in such conventional conveyer systems necessitates only negligible alterations in the construction of the structure which guides the material transporting belt.

A concomitant object of the invention is to provide a novel undercarriage for a material loading conveyance of the above outlined characteristics and to construct the undercarriage in such a way that it constitutes a self-propelled vehicle.

Still another object of the invention is to provide a very simple but rugged and long-lasting shock absorbing structure for the material guiding part of the conveyance and to provide the undercarriage of the conveyance with a very simple driving connection which can advance the material guiding part along the inclined section of its path and all the way to the top of the driving station.

Briefly stated, one feature of our invention resides in the provision of a conveyer system which is particularly suited for use in surface mining and which comprises a substantially horizontal first track including one or more rails extending along the supporting frames of the main truss for the material transporting belt, an inclined second track which includes rails provided on the bridge and/or on the driving station of the terminal truss and whose lower end is adjacent to and is located at a level above the first track, and a conveyance comprising a mobile (preferably inverted U-shaped or gantry-like under carriage or truck mounted for travel along the first track, a substantially trough-shaped open-ended upper carriage or dolly mounted on the truck and adapted to travel along the second track, and coupling means detachably securing the dolly to the truck so that, when the truck is moved along the first track to a position adjacent the lower end of the second track and is detached from the dolly, the latter may be advanced along the second track and back onto the truck.

The dolly comprises a preferably trough-shaped assembly of rollers or similar supports which maintain a portion of the upper stringer of the material transporting belt at a level above the remainder of the upper stringer, and the dolly is also provided with side walls which form a chute and guide broken ore of other material onto the raised portion of the upper stringer. Since the heavier part (i.e., the truck) of the conveyance need not travel along the second track, this second track need not be made exceptionally strong and the drive which advances the dolly along the second track consumes relatively little energy.

In accordance with another feature of our invention, the drive which advances the truck along the first track may be utilized to advance the dolly along the second track while the truck remains anchored adjacent the lower end of the second track.

The novel features which are considered as characteristic of the invention are set forth in particular in the appended claims. The improved conveyer system itself, however, both as to its construction and its mode of operation, together with additional features and advantages thereof, will be best understood upon perusal of the following detailed description of a specific embodiment with reference to the accompanying drawings, in which:

FIG. 1 is a side elevational view of a fully assembled conveyance which forms part of the improved conveyer system;

FIG. 2 is an end elevational view of the conveyance, as seen from the left-hand side of FIG. 1;

FIG. 3a illustrates the left-hand part of the conveyer system with a portion of the bridge and with the driving station, the dolly of the conveyance being shown on the bridge during its advance toward the upper end of the driving station; and FIG. 3b illustrates the remainder of the bridge and a portion of the main truss, the truck of the conveyance being illustrated in an end position adjacent to the lower end of the second track.

In the following detailed description of the drawings, FIGS. 3a and 3b will be referred to as FIG. 3.

The improved conveyer system comprises a conveyance or vehicle having a mobile gantry-like undercarriage or truck 2 and a substantially trough-shaped upper carriage or dolly 1. The dolly 1 is detachably coupled to the truck 2, and the latter is provided with wheels 28 which travel on a first track including horizontal lower rails 5 and 6 mounted on transverse ties 4 resting on the ballast. The main truss includes a series of interconnected supporting frames 3 which are arranged end-to-end and rest on and are secured to the ties 4 between the rails 5 and 6. A wheel-mounted mobile driving station 7 slopes upwardly in a direction to the left, as viewed in FIG. 3. The wheels of the station 7 can travel along the rails 5, 6 of the first track, and the upper end portion of this station supports the discharge drum or transfer drum 9 which is located at the left-hand end turn of a material transporting belt. The connection between the foremost supporting frame 3 and the driving station 7 includes a sloping wheel-mounted bridge 8 whose upper side defines an intermediate section of the inclined path for the dolly 1. The upper stringer 10 of the belt is supported and guided by sets of mutually inclined upper rolls 11 (see particularly FIG. 2), and the lower stringer 12 of the belt is guided by lower rolls 13. The rolls 11 and 13 are mounted in the supporting frames 3. The parts 7 and 8 together constitute the terminal truss of our conveyer system, and each of these parts is also provided with suitable guide means for the belt.

The frame of the dolly 1 comprises a pair of elongated horizontal frame members 14 and 15 which are parallel with the lower rails 5 and 6 and are rigidly connected to each other by a series of transverse frame members 16 best shown in FIGS. 1 and 2. The frame members 16 preferably consist of tubular metallic stock and form a grate which supports a trough-shaped supporting assembly 17 for a portion of the upper stringer 10. This assembly 17 includes several sets 18 of rollers 18a, and each such set 18 also includes three shafts 18b mounted on the transverse frame members 16 in such a way that the median shaft 18b is horizontal (see FIG. 2) and the two outer shafts 18b extend outwardly and upwardly toward the horizontal frame members 14, 15. The horizontal frame members 14, 15 support a series of upright frame members 20 serving to carry inclined side walls 19 which together form a chute for guiding broken ore or similar material onto that portion of the upper stringer 10 which extends above the supporting assembly 17. The horizontal frame members 14, 15 carry two rows of upper wheels 21 which are mounted at the lower ends of swingable arms 22. The upper end of each arm 22 is rockably attached to the frame of the dolly 1 by a transverse horizontal pivot pin 23, and each arm 22 is biased by one or more strong compression springs 24 so that the entire frame of the dolly 1 may swing about the pivot pins 23 to move nearer to or further away from the top portion of the truck 2. The arms 22 and the springs 24 together constitute a series of shock absorbers for the dolly 1.

The gantry-like truck 2 comprises a rigid frame whose platform-like top portion includes longitudinally extending horizontal beams 26 connected to each other by transversely extending substantially horizontal beams 25. The top portion 25, 26 is supported by downwardly and outwardly extending lateral beams or legs 27 which carry the aforementioned lower wheels 28. Each wheel 28 is rotated by a separate drive including a reversible motor 29 and a transmission 30. Each transmission 30 can drive a sprocket wheel 31 which drives an endless chain 32 trained around a second sprocket wheel coaxially secured to the respective lower wheel 28. It is clear that the sprocket wheels 31 and chains 32 may be replaced by belt-and-pulley drives or by other suitable motion transmitting systems.

The coupling means which enables the operators to detach the dolly 1 from the truck 2 comprises a series of upwardly extending coupling members or brackets 35 which are fixed to the platform of the truck 2, downwardly extending coupling members or brackets 34 which are secured to the horizontal frame members 14, 15 of the dolly 1 and overlap the lower brackets 35, and transverse horizontal coupling bolts 33 extending through registering apertures provided in the overlapping brackets 34, 35.

The dolly 1 is coupled to the truck 2 when the latter travels along the first track including the rails 5 and 6 toward and away from the lower end of the sloping upper surface of the bridge 8. When the thus assembled conveyance 1, 2 reaches the left-hand end of the horizontal track i.e., when the gantry-like truck 2 straddles the leftmost supporting frame 3 and is adjacent the lower end of the bridge 8, the truck is anchored or fixed in such position so that it cannot advance along the rails 5, 6. The anchoring means includes one, two or more pairs of pivotable props 36 which are articulately connected to the top portion of the truck 2 and whose free ends carry ground-engaging shoes. FIG. 1 shows one pair of shoes in actual contact with the ballast, the other pair of shoes being still in inoperative position at a level above the ground. The anchoring means further includes several clamping devices 37 which are carried by the truck 2 and may be manipulated to engage the rails 5 and 6 to thus prevent any displacements of the truck from the position shown in FIG. 3. Once the truck 2 is safely anchored in such position, the operators withdraw the coupling bolts 33 so that the dolly 1 is free to move with reference to the truck. The wheels 21 of the dolly 1 rest on rails 38 provided on the top portion of the truck 2, and the foremost ends of the rails 38 are aligned with similar rails 38a provided on the top portion of the inclined bridge 8. The rails 38 are supported by the longitudinal beams 26 of the truck 2, and the foremost ends of the rails 38a on the bridge 8 are aligned with similar rails 38b provided at the upper side of the driving station 7. The rails 38a and 38b constitute an inclined second track which guides the dolly on its way from the rails 38 to the transfer drum 9 or vice versa.

In order to save expenses, the motors 29 which drive the lower wheels 28 may be utilized to advance the dolly 1 along the second track including the inclined rails 38a and 38b. The transmissions 30 comprise claw clutches (now shown) which may be disengaged so that the sprocket wheels 31 are disconnected from the respective motors 29 and the transmissions 30 then operate a series of winches or similar drives which advance the dolly 1 along the rails 38, 38a, 38b and all the way to the transfer drum 9. Each transmission 30 then drives a capstan barrel or a winch arranged to take up a cable, rope, chain or similar flexible element which is connected to the dolly 1 and is trained around pulleys 39 carried by the terminal truss of the inclined bridge 8 or driving station 7 in order to advance the dolly along the rails 38a and 38b. When the dolly 1 is again coupled to the truck 2, the capstan barrels are disconnected from the respective motors 29 and the sprockets 31 are again driven by the respective transmissions 30 so that the conveyance 1, 2 may be advanced along the first track including the rails 5 and 6.

The upper stringer 10 of the belt rests on the upper rolls 11 but that portion of this upper stringer which is supported by the roller assembly 17 of the dolly 1 is invariably located at a level above the rolls 11. The side walls 19 guide broken ore or similar material onto that portion of the upper stringer 10 which is supported by the roller assembly 17.

The conveyer system which is shown in FIGS. 1 to 3 is susceptible of many modifications without departing from the spirit of our invention. For example, the roller assembly 17 may be replaced by a band or belt, and both rails 5, 6 may be provided at one side of the belt because the advancing machine operates from one side only. Also, the lower wheels 28 can be replaced by caterpillar treads, by ground-engaging shoes of the type used in so-called "walking" mine roof supports, or by other suitable advancing means which lend mobility to the truck 2.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and, therefore, such adaptations should and are intended to be comprehended within the meaning and range of equivalence of the following claims.

What is claimed as new and desired to be secured by Letters Patent is:

1. In a conveyer system, particularly for use in surface mining, in combination, a substantially horizontal first track; an inclined second track having a lower end adjacent to and located at a level above said first track; and a conveyance comprising a mobile truck mounted for travel along said first track, a dolly mounted on said truck and adapted to travel along said second track, said dolly comprising a chute and a belt supporting assembly disposed below said chute so that a belt supported by such assembly may receive material which passes through said chute, and coupling means detachably securing said dolly to said truck so that, when the truck is moved along said first track to a position adjacent the lower end of said second track and is detached from said dolly, the latter may be advanced along said second track and back onto said truck.

2. A conveyance, particularly for use in conveyer systems for surface mining, comprising a mobile truck having a top portion provided with elongated rails; a dolly having wheels supported by said rails and comprising a chute and a belt supporting assembly mounted below said chute; and coupling means detachably securing said dolly to said truck.

3. A conveyance, particularly for use in conveyer systems for surface mining, comprising a mobile truck having a top portion provided with elongated rails; a dolly comprising a frame, a chute provided in the upper portion of said frame, a belt supporting assembly mounted in said frame at a level below said chute, a plurality of wheels supported by said rails, and shock absorber means coupling said wheels to said frame; and coupling means detachably connecting said dolly to said truck.

4. A conveyance as set forth in claim 3, wherein said shock absorber means comprises a plurality of spring-biased arms each rotatably supporting one of said wheels and each pivotally attached to the frame of said dolly.

5. In a conveyer system, particularly for use in surface mining, in combination, a substantially horizontal track comprising elongated rail means; and a conveyance including a truck having wheels supported by said rail means and a top portion provided with elongated rails, anchoring means for arresting and for maintaining said truck in a selected position with reference to said track, a dolly having wheels supported by the rails on the upper portion of said truck, said dolly further having a chute and a belt supporting assembly located at the lower end of said chute so that a belt supported by said assembly may receive material which is introduced through said chute, and coupling means detachably connecting said dolly to said truck.

6. A structure as set forth in claim 5, wherein said anchoring means comprises at least one elongated prop articularly connected with said truck and having an end portion movable into and out of engagement with the ground.

7. A structure as set forth in claim 5, wherein said anchoring means comprises at least one clamping device mounted on said truck and adapted to engage said rail means.

8. In a conveyer system, particularly for use in surface mining, in combination, a substantially horizontal elongated main truss; a substantially horizontal first track adjacent to and extending along said main truss, a mobile terminal truss mounted for travel along said first track and provided with a sloping surface extending upwardly from and having a lower end located at a level above said main truss; a second track extending along said sloping surface and supported by said terminal truss; a rotary transfer member mounted on said terminal truss at the upper end of said sloping surface; an elongated material transporting belt trained around said transfer member, said belt having an upper stringer extending above said sloping surface and along said main truss and a lower stringer extending below said sloping surface and along said main truss; support means provided on said main truss for supporting and guiding said stringers; and a conveyance comprising a mobile truck mounted for travel along said first track and comprising a top portion provided with a third track which constitutes an extension of said second track when the truck is moved to a position adjacent the lower end of said sloping surface, a dolly having wheels supported by said third track and a chute located at a level above said upper stringer, said dolly further comprising a supporting assembly for a portion of said upper stringer and said supporting assembly being located at a level above the support means on said main truss so that said portion of the upper stringer is located above the level of that part of the belt which extends along said main truss, said supporting assembly being located at the lower end of said chute so that material which is delivered through the chute descends onto said upper stringer, and coupling means detachably securing said dolly to said truck so that, when the truck is moved to said position adjacent the lower end of said sloping surface and is disconnected from said dolly, the latter may be advanced from said third track and along said second track all the way to said rotary transfer member.

9. A structure as set forth in claim 8, further comprising individual drive means for each wheel of said truck.

10. A structure as set forth in claim 8, further comprising drive means arranged to alternatively drive the wheels of said truck and to advance said dolly along said second track.

11. A structure as set forth in claim 10, wherein said drive means comprises motor means provided on said truck and at least one flexible element trained around pulley means provided on said terminal truss and having one end connected with said dolly, and means adapted to be driven by said motor means and to take up said flexible element so that the dolly is caused to travel along said second track and toward said rotary transfer member.

12. A structure as set forth in claim 10, wherein said drive means comprises a separate motor for each wheel of said truck, a transmission driven by the respective motor, and a chain drive connecting the transmission with the respective wheel.

13. In a conveyer system, particularly for use in surface mining, in combination, a substantially horizontal elongated main truss; a substantially horizontal first track adjacent to and extending along said main truss; a mobile terminal truss mounted for travel along said first track and provided with a sloping surface extending upwardly from and having a lower end located at a level above said main truss; a second track extending along said sloping surface and supported by said terminal truss; a rotary transfer member mounted on said terminal truss at the upper end of said sloping surface; an elongated material transporting belt trained around said transfer member, said belt having an upper stringer extending above said sloping surface and along said main truss and a lower stringer extending below said sloping surface and along said main truss; support means provided on said main truss for supporting and guiding said stringers; and a conveyance comprising a mobile truck mounted for travel along said first track and comprising a top portion provided with a third track which constitutes an extension of said second track when the truck is moved to a position adjacent the lower end of said sloping surface, a dolly having resiliently mounted wheels supported by said third track and a chute located at a level above said upper stringer, said dolly further comprising a supporting assembly for a portion of said upper stringer and said supporting assembly being located at a level above the support means on said main truss so that said portion of the upper stringer is located above the level of that part of the belt which extends along said main truss, said supporting assembly comprising a plurality of rollers located at the lower end of said chute so that material which is delivered through the chute descends onto said upper stringer, and coupling means detachably securing said dolly to said truck so that, when the truck is moved to said position adjacent the lower end of said sloping surface and is disconnected from said dolly, the latter may be advanced from said third track and along said second track all the way to said rotary transfer member, said coupling means comprising pairs of overlapping coupling members having aligned apertures and bolts extending through such apertures.

14. In a conveyer system, particularly for use in surface mining, in combination, a substantially horizontal elongated main truss; a substantially horizontal first track adjacent to and extending along said main truss; a mobile terminal truss mounted for travel along said first track and provided with a sloping surface extending upwardly from and having a lower end located at a level above said main truss; a second track extending along said sloping surface and supported by said terminal truss; a rotary transfer member mounted on said terminal truss at the upper end of said sloping surface; an elongated material transporting belt trained around said transfer member, said belt having an upper stringer extending above said sloping surface and along said main truss and a lower stringer extending below said sloping surface and along said main truss; support means provided on said main truss for supporting and guiding said stringers; and a conveyance comprising a mobile truck mounted for travel along said first track and comprising a top portion provided with a third track which constitutes an extension of said second track when the truck is moved to a position adjacent the lower end of said sloping surface, a dolly having wheels supported by said third track and a chute located at a level above said upper stringer, said dolly further comprising a supporting assembly for a portion of said upper stringer and said supporting assembly being located at a level above the support means on said main truss so that said portion of the upper stringer is located above the level of that part of the belt which extends along said main truss, said supporting assembly being located at the lower end of said chute so that material which is delivered through the chute descends onto said upper stringer, coupling means detachably securing said dolly to said truck so that, when the truck is moved to said position adjacent the lower end of said sloping surface and is disconnected from said dolly, the latter may be advanced from said third track and along said second track all the way to said rotary transfer member, and anchoring means for fixing the truck in said position when the dolly is detached.

References Cited by the Examiner

UNITED STATES PATENTS

| | | | |
|---|---|---|---|
| 1,280,144 | 10/1918 | Bonner | 104—29 |
| 2,108,813 | 2/1938 | Fitch | 214—38 |
| 2,937,774 | 5/1960 | Roberts | 214—450 |

EVON C. BLUNK, *Primary Examiner.*

EDWARD A. SROKA, *Examiner.*